Aug. 18, 1964 M. STEVENS 3,144,728
LURE RETRIEVER
Filed Feb. 19, 1962
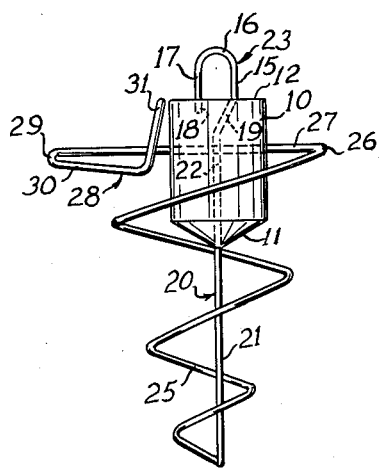
Fig. 1
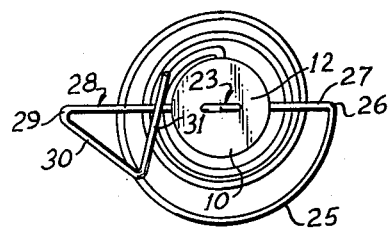
Fig. 2
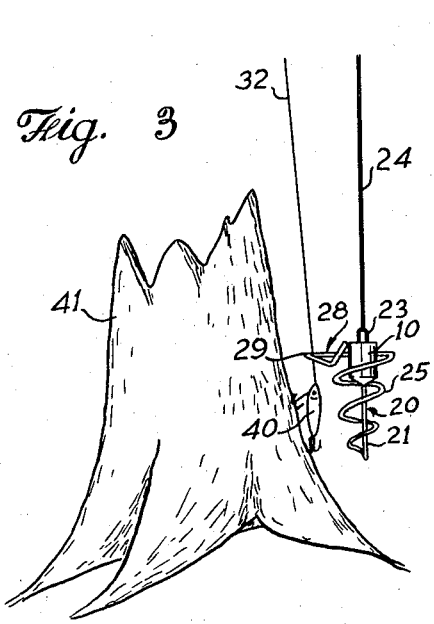
Fig. 3
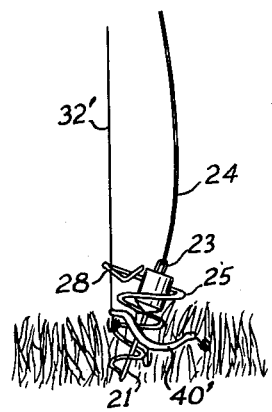
Fig. 4
INVENTOR.
Marvin Stevens
BY
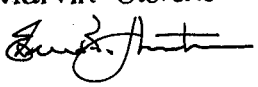
ATTORNEY

United States Patent Office 3,144,728
Patented Aug. 18, 1964

3,144,728
LURE RETRIEVER
Marvin Stevens, 4903 Buford Highway, Norcross, Ga.
Filed Feb. 19, 1962, Ser. No. 174,095
4 Claims. (Cl. 43—17.2)

This invention relates to a lure retriever, and is more particularly concerned with a retrieving device for engaging and retrieving fishing lures, hooks and the like.

It is often desirable when fishing with a rod and reel to have some devices which will dislodge a fishing lure which has hooked onto a sunken log or has become fouled in other debris below the surface of the water. In the past, many attempts have been made to provide such devices; however, these devices have usually been rather cumbersome, relatively expensive to manufacture and difficult to use. A number of devices have been provided, however, which slide along the line leading to the fishing lure so as to engage the lure in an attempt to dislodge it. Many of the prior art devices are essentially unidirectional in that no appreciable force may be transmitted to the device and thence to the lure except in an upwardly direction. Other devices provide for engaging only a single hook of a lure and hence may tend to break this hook or to provide insufficient engagement therewith to dislodge the lure. Some of the prior art devices, while providing a means for pounding upon the hook to dislodge it, provide no means which actually retrieve the hook.

In an effort to overcome the difficulties and disadvantages described above, I have devised a lure retriever which is omnidirectional in that it will act on the hook regardless of the orientation of the device. Briefly, the present device includes a central weight through which extends a metal wire. One end of the metal wire forms a bail for receiving the end of a control line and the other end of the metal wire extends in an axial direction downwardly and then is provided with a helical expanding coil, defining a cone-shaped arrangement, the wire terminating in a transverse member passing again through the weight. The protruding end of the wire is provided with a loop or open eyelet which removably receives the fishing line to which the lure is attached. By such an arrangement, the lure retriever may be placed on the fishing line, readily and easily, the lure retriever sliding along the line until it reaches the fouled lure. The tightening and loosening of the control line connected to the lure retriever causes the retriever to move upwardly and downwardly on the fishing line and to pivot about its looped end when the retriever reaches the proximity of the lure, thereby to engage the lure and its hooks. Thus, subsequent pulling on the lure will tend to dislodge it.

Accordingly, it is an object of the present invention to provide an omnidirectional lure retriever.

Another object of the present invention is to provide a lure retriever which will readily and easily dislodge a fishing hook or a fishing lure from debris in the water.

Another object of the present invention is to provide a lure retriever which is inexpensive to manufacture, durable in structure and efficient in operation, the lure retriever being well designed to meet the demands of economic manufacture.

Another object of the present invention is to provide a lure retriever which will retrieve a lure from entanglement with grass, weeds, a stump or the like.

Other objects, features and advantages of the present invention will become apparent from the following description when taken in conjunction with the accompanying drawings wherein like characters of reference designate corresponding parts throughout the several views, and wherein:

FIG. 1 is a side elevational view of a lure retriever constructed in accordance with the present invention.

FIG. 2 is a plan view of the lure retriever shown in FIG. 1.

FIG. 3 is a side elevational view showing the lure retriever of FIG. 1 in an operative position for engaging and dislodging a lure from a tree stump.

FIG. 4 is a side elevational view showing the lure retriever of FIG. 1 in an operative position for dislodging a lure tangled in grass or weeds.

Referring now in detail to the embodiment chosen for the illustration of the present invention, it being understood that in its broader aspects the present invention is not limited to the exact details herein depicted, numeral 10 denotes generally a cylindrical weight formed of lead or other heavy metal, the weight 10 having a conical outwardly protruding lower end 11 and a flat upper end 12. Thus the counterweight 10 is a right cylindrical member having its lower end tapered downwardly. Extending through the central portion of the weight 10 is a relatively rigid, yet flexible, circular wire, denoted generally by numeral 20.

In more detail, the wire 20 includes a straight downwardly extending shank 21 which emerges from bottom 11 and is coaxial with weight 10. Within the weight 10, the wire 20 extends upwardly along the axis of weight 10, as indicated at numeral 22 and then, toward the upper surface of end 12, the wire 20 is bent outwardly whereby the wire 20 angles upwardly at numeral 19 and emerges, through top 12, at a spaced distance from the axis thereof.

The upper end of wire 20, above top 12, is bent inwardly at the surface of top 12 so as to provide a leg 15 of a bail 23, the leg being parallel to but offset from the axis of weight 10. Thence, the wire 20 is bent in a semi-circle to provide a loop 16 having a second leg 17 which passes downwardly parallel to the first leg 15 and into the weight 10 whereby the end 18 of wire 20 is imbedded in weight 10, thereby defining an inverted U-shaped member. The U-shaped bail 23 functions as a suspension means which is adapted to receive a control line or cord 24 by means of which the action of the lure retriever is controlled.

At the lower end of shank 21, the wire is bent to form an acute angle with respect to the shank 21 and is curved in diverging fashion to form a cone-shaped helix 25 which surrounds the shank 21 and extends upwardly in a circular expanding path so as to terminate in the plane of the central portion of weight 10, the end of helix 25 being spaced outwardly therefrom.

The upper end of the helix 25 is bent inwardly at numeral 26 to provide a straight crossbar 27 which passes transversely through weight 10 substantially perpendicular to the axis thereof and emerges on the far side of weight 10. Outwardly of the weight 10, the emerging end of crossbar 27 is bent to form an open eyelet or guide, denoted generally by numeral 28. Preferably, the eyelet 28 is formed by bending the wire 20 to an acute angle at numeral 29 so as to provide a straight side member 30 which diverges inwardly from bar 27 and is tangential to and spaced from weight 10 as seen in FIG. 2. The end of member 28 is bent inwardly to provide a base member 31 which crosses the crossbar 27 outwardly adjacent the weight 10, as illustrated in FIGS. 1 and 2.

It is now seen that I have provided a weight 10 having a downwardly extending shank 21 surrounded by a downwardly tapering helix 25, the ends of which are respectively joined to one side of the weight 10 and the lower end of shank 21, the weight 10, shank 21 and helix 25 being in coaxial relationship to each other with the larger end of helix 25 surrounding the lower and central portions of weight 10 and the smaller end of helix 25 surrounding shank 21. There is a narrow space between the member 31 and the crossbar 27 whereby a fishing line 32 may be passed through the space and into the eyelet 28.

In operation, if the hooks of a lure 40 have become fouled or engaged in say a tree stump 41, the line 32 attached to the lure 40 is reeled in as much as possible and held taut so that the line 32 is at as steep an angle as practical without parting the line 32. The eyelet 28 is then placed on the line 32 and permitted to slide downwardly. The V-shaped arms of eyelet 28, i.e. cross bar 27 and member 30, will tend to deflect the branches of trees as the retriever slides downwardly.

When the eyelet 28 strikes the lure 40 or is otherwise arrested in its downward movement, the junction at numeral 29 becomes a fulcrum, pivot point or swivel point. Since the line 32 is essentially vertical, manipulation of control line 24 in a circular path may cause the retriever to swing around the lure 40 until the helix 25 engages one or several of the hooks of lure 40. Tightening or loosening the control line 24 will cause the retriever to pivot upwardly and downwardly in an arcuate path, thereby imparting a knocking action to the lure 40 which may tend to dislodge the hooks thereof. Also, the hooks may become engaged in helix 25. It will be understood that, regardless of the position of the retriever, the helix 25 will be presented to the hooks in such a manner that there is a possibility of engagement of the hooks on helix 25.

In many instances, the horizontal pivoting action or the vertical knocking action or a combination of these actions will be sufficient to dislodge the hooks; however, if the hook or hooks of the lure 40 are deeply embedded in the stump 41, a strong pull on the control line 24 will cause hook or hooks to travel to the lowermost portion of the helix 25 and perhaps impart a rotary motion to the retriever during such travel, whereby the line 32 may be wrapped around shank 21. Thus, the hooks and the line (and indeed perhaps the sinker, if one is present) will be engaged by the retriever, the hook traveling to a position adjacent the end of shank 21. This sufficiently engages the lure 40 with the retriever to permit a strong pull on control line 24 to straighten the embedded hook and dislodge it.

One method of utilizing the retriever is simply to move the boat (not shown) directly over the lure, such as lure 40, and lower the retriever on the line, such as line 32', until it reaches the end of its travel. At this time the retriever is worked up and down until the hooks of lure 40' are engaged. Thereafter, the control line 24 is pulled in, carrying with it the retriever and lure 40'.

It will be obvious to those skilled in the art that many variations may be made in the embodiment chosen for the purpose of illustrating the present invention without departing from the scope thereof as defined by the appended claims.

I claim:
1. A fish lure retriever comprising a weight, a tapered helix, said helix being mounted by both ends coaxially on the weight, the narrowed portion of said helix extending below the lower portion of said weight, a guide extending from said weight substantially perpendicularly to the axis of said weight, and suspension means on one end of said weight.

2. A fish lure retriever comprising a substantially cylindrical weight, a tapered helix, said tapered helix being mounted coaxially with said weight and surrounding the lower portion of said weight, the larger end of said tapered helix surrounding said weight, while the smaller end of said tapered helix is disposed below said weight, a shank set fast in the lower end of said weight along the axis of said weight, said shank joining said smaller end of said tapered helix, a guide extending radially from said weight above said helix, and suspension means on the top of said weight.

3. A fish lure retriever comprising a substantially cylindrical weight, a tapered helix, said tapered being mounted coaxially with said weight and surrounding the lower portion of said weight, the larger end of said tapered helix surrounding said weight while the smaller end of said tapered helix is disposed below said weight, a shank set fast into said weight on the axis of said weight, said shank joining the smaller end of said helix, the upper end of said helix terminating in a portion extending diametrically through said weight, one end of said portion being formed into a guide member which is spaced from and perpendicular to said shank, and a loop member on the top of said weight set fast into said weight to act as suspension means for said lure retriever.

4. A fish lure retriever comprising a tapered helix, a weight attached to said helix, coaxial with said helix, a shank extending axially of said helix integral with the smaller end of said helix, said shank set fast into said weight, the larger end of said helix terminating in a diametrically extending portion, said portion extending through said weight, the end of said portion being formed into a loop, and a loop member on one end of said weight by which to suspend said lure retriever.

References Cited in the file of this patent
UNITED STATES PATENTS

| | | |
|---|---|---|
| 1,709,298 | Zoppa | Apr. 16, 1929 |
| 2,758,406 | Childress | Aug. 14, 1956 |
| 2,770,062 | Russell | Nov. 13, 1956 |
| 2,807,905 | Ford | Oct. 1, 1957 |
| 2,948,077 | Karpes | Aug. 9, 1960 |